United States Patent
Murawski et al.

(10) Patent No.: US 9,618,993 B2
(45) Date of Patent: *Apr. 11, 2017

(54) SYSTEM AND METHOD FOR POWER MANAGEMENT OF MOBILE DEVICES

(71) Applicant: VOCOLLECT, INC., Pittsburgh, PA (US)

(72) Inventors: Mark David Murawski, Pittsburgh, PA (US); Philip E. Russell, Mt. Pleasant, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/682,615

(22) Filed: Apr. 9, 2015

(65) Prior Publication Data

US 2015/0212565 A1    Jul. 30, 2015

Related U.S. Application Data

(63) Continuation of application No. 13/288,476, filed on Nov. 3, 2011, now Pat. No. 9,015,513.

(51) Int. Cl.
*G06F 1/00* (2006.01)
*G06F 1/32* (2006.01)
*H04W 52/02* (2009.01)

(52) U.S. Cl.
CPC .......... *G06F 1/3203* (2013.01); *G06F 1/329* (2013.01); *G06F 1/3212* (2013.01); *H04W 52/0258* (2013.01); *H04W 52/0261* (2013.01); *H04W 52/0277* (2013.01)

(58) Field of Classification Search
None
See application file for complete search history.

(56) References Cited

U.S. PATENT DOCUMENTS

| | | |
|---|---|---|
| 5,455,499 A | 10/1995 | Uskali et al. |
| 5,739,674 A | 4/1998 | Kawahara et al. |
| 6,078,791 A | 6/2000 | Tuttle et al. |
| 6,127,933 A | 10/2000 | Ohmura et al. |
| 6,157,169 A | 12/2000 | Lee |
| 6,201,372 B1 | 3/2001 | Green, Jr. et al. |
| 6,236,214 B1 | 5/2001 | Camp, Jr. et al. |
| 6,260,111 B1 | 7/2001 | Craig et al. |
| 6,313,832 B1 | 11/2001 | Ishida |
| 6,384,578 B1 | 5/2002 | Patino et al. |

(Continued)

FOREIGN PATENT DOCUMENTS

| | | |
|---|---|---|
| EP | 2224575 A1 | 2/2009 |
| WO | 2011020060 A2 | 2/2011 |

*Primary Examiner* — Nitin Patel
(74) *Attorney, Agent, or Firm* — Additon, Higgins & Pendleton, P.A.

(57) ABSTRACT

A method and system of managing power usage of devices including selectively executing a program application on a plurality of battery powered devices. Battery usage data is generated for a battery in one or more of the devices during execution of the work application. The battery usage data includes the run-time of the battery for the work application being executed. The data is aggregated and stored for the plurality of devices in memory. An application specific battery profile is generated using the stored battery usage data. The application specific battery profile is associated with the work application being run by the client devices.

20 Claims, 3 Drawing Sheets

(56) References Cited

U.S. PATENT DOCUMENTS

| | | |
|---|---|---|
| 6,484,110 B1 | 11/2002 | Jung |
| 6,501,949 B1 | 12/2002 | Singleton |
| 6,693,996 B2 | 2/2004 | Mansfield |
| 6,710,578 B1 | 3/2004 | Sklovsky |
| 6,785,786 B1 | 8/2004 | Gold et al. |
| 7,264,903 B2 | 9/2007 | Coffey et al. |
| 7,264,904 B2 | 9/2007 | Coffey et al. |
| 7,288,126 B2 | 10/2007 | Gordon et al. |
| 7,295,129 B2 | 11/2007 | Eisenson |
| 7,407,724 B2 | 8/2008 | Coffey et al. |
| 7,409,569 B2 | 8/2008 | Illowsky et al. |
| 7,514,815 B2 | 4/2009 | Paik et al. |
| 7,516,141 B2 | 4/2009 | Ruan et al. |
| 7,528,576 B2 | 5/2009 | Ukon |
| 7,612,472 B2 | 11/2009 | Mutabdzija et al. |
| 7,622,894 B2 | 11/2009 | Kawahara et al. |
| 7,653,834 B2 | 1/2010 | Mangione-Smith |
| 7,711,814 B1 | 5/2010 | Emerick et al. |
| 7,716,500 B2 | 5/2010 | Esliger |
| 7,739,524 B2 | 6/2010 | Mangione-Smith |
| 7,779,408 B1 | 8/2010 | Papineau |
| 7,840,605 B2 | 11/2010 | Ruan et al. |
| 8,054,045 B2 | 11/2011 | Kawahara et al. |
| 8,200,808 B2 | 6/2012 | Ishida |
| 8,306,509 B2 | 11/2012 | Sigmund et al. |
| 8,321,701 B2 | 11/2012 | Obr et al. |
| 8,340,644 B2 | 12/2012 | Sigmund et al. |
| 8,351,903 B2 | 1/2013 | Sigmund et al. |
| 8,401,526 B2 | 3/2013 | Sigmund et al. |
| 8,406,743 B2 | 3/2013 | Sigmund et al. |
| 8,412,162 B2 | 4/2013 | Sigmund et al. |
| 8,442,496 B2 | 5/2013 | Sigmund et al. |
| 8,478,239 B2 | 7/2013 | Sigmund et al. |
| 8,489,074 B2 | 7/2013 | Sigmund et al. |
| 8,503,988 B2 | 8/2013 | Sigmund et al. |
| 8,509,745 B2 | 8/2013 | Sigmund et al. |
| 8,515,395 B2 | 8/2013 | Sigmund et al. |
| 8,531,718 B2 | 9/2013 | Furukawa et al. |
| 8,548,438 B2 | 10/2013 | Sigmund et al. |
| 8,660,809 B2 * | 2/2014 | Yu .................. G01R 31/3651 320/106 |
| 2001/0008424 A1 | 7/2001 | Higuchi et al. |
| 2002/0093312 A1 | 7/2002 | Choo |
| 2003/0023673 A1 | 1/2003 | Tso |
| 2004/0104706 A1 | 6/2004 | Ooi et al. |
| 2009/0287433 A1 | 11/2009 | Houston et al. |
| 2010/0138177 A1 | 6/2010 | Yu |
| 2011/0111799 A1 | 5/2011 | Kothari et al. |

\* cited by examiner

SYSTEM AND METHOD FOR POWER MANAGEMENT OF MOBILE DEVICES

CROSS-REFERENCE TO RELATED APPLICATIONS

The present application claims the benefit of U.S. patent application Ser. No. 13/288,476 for a U.S. patent application Ser. No. 13/288,476 for a System and Method for Power Management of Mobile Device filed Nov. 3, 2011 (and published May 9, 2013 as U.S. Patent Application Publication No. 2013/0117595), now U.S. Pat. No. 9,015,513. Each of the foregoing patent application, patent publication, and patent is hereby incorporated by reference in its entirety.

FIELD OF THE INVENTION

Embodiments of the invention relate to mobile terminals and other mobile devices and more particularly to power management of mobile terminals having power sources such as batteries.

BACKGROUND

Wearable, mobile and/or portable computer terminals or devices are used for a wide variety of tasks. Such terminal devices allow the workers using them ("users") to maintain mobility, while providing the users with desirable computing and data gathering and processing functions. Furthermore, such mobile terminal devices often provide a communication link to a larger, more centralized management computer and/or computer system that directs the activities of the user and processes any collected data. Often, such mobile terminal devices are implemented in speech-directed or speech-assisted work environments. In such environments, a speech dialog is maintained between the terminal device and a user. The terminal devices include a speech engine that is implemented in processor hardware and software and the terminal devices connect with a headset for the purpose of maintaining a speech dialog with a user. The speech engine includes a speech recognition function that recognizes speech that is captured from a user through the headset and also includes a text-to-speech (TTS) function that converts data to speech to be played to the user through the headset. In that way, a speech dialog is maintained between the terminal device and the user for facilitating various work tasks. In addition to the speech dialog, various peripheral devices might be implemented and interfaced with the terminal device, such as barcode or RFID readers, displays, printers, or other devices to operate in conjunction with the speech dialog for facilitating the various work tasks.

One example of a specific use for a wearable/mobile/portable terminal device is a within a product management system that involves product distribution and tracking as well as product inventory management. Such systems are sometimes referred to as warehouse management systems (WMS). In a conventional WMS system, a large number of users (each using a terminal device) are directed, through speech, to move around throughout a warehouse and complete various tasks, such as to pick certain products to fill an order or to put away or replenish items at storage locations. To that end, the terminal devices are loaded prior to the start of each user work shift with one or more work applications. The work applications are then executed by the user and such work applications usually include a plurality of tasks that are to be performed by the user. Using a speech dialog through a terminal device and headset, a user is directed to move around to various locations, to perform various tasks and to respond to inquiries using speech. In that way, the various tasks are completed and data that is associated with the work application is gathered. The terminal devices incorporate wireless radios (e.g. WiFi radios) or other communication links in order to exchange data with servers running the WMS system for the purposes of managing the workflow. The terminal devices also communicate with one or more management applications for the purposes of managing and configuring the terminal devices, loading work applications onto the terminal devices, managing the users that are working with the terminal devices, and providing system diagnostics.

Such mobile terminal devices utilize portable power elements, such as batteries to power their electronics. For efficient use of such terminal devices during a work shift, it is desirable to monitor and manage the battery life of each device so that the user knows when they may need to replace or recharge the batteries of their device. Currently, warehouse management systems and terminal management systems can only provide a somewhat coarse, and not particularly accurate, indication to a user of the existing battery life for the battery in their device. Certain power management schemes in such systems generally rely only upon battery operating parameters for a single device. For example, a management scheme may monitor battery life based upon the measured output voltage of the battery or may monitor some other battery operational metric. However, such power management schemes do not take into account the particular features of the use of the battery or a specific workflow. Nor do such schemes go beyond the individual device or look at groups of user devices and batteries that might have common usage characteristics. However, such a voltage parameter or other operational metric, in most cases, is not a sufficient or accurate measurement for determining remaining battery life. This is because the battery operational parameters or metrics like voltage will not be particularly linear parameters. Furthermore, the run-time remaining for a particular battery is affected by many factors, such as the actual power consumption profile of the particular device.

The power consumption of a device may vary somewhat radically based upon the various voice applications that are in use. For example, the load of the CPU or other processor required by a work application is different between various work applications. Furthermore, the network traffic that is maintained by the terminal, such as to communicate with the WMS system may vary significantly between terminals. Still further, different peripheral devices used with the terminal device can drastically change how much power the terminal device is consuming. Therefore, it is difficult to accurately measure power consumption at different times within a work shift. Still further, the power consumption of the different work applications being run on a device may also vary, wherein some applications consume power in bursting spikes of high power consumption, while other work applications might consume a higher consistent and average amount of power. All these factors affect how accurately battery life may be predicted. Since changing batteries, or losing power within the middle of a particular work application or shift cuts down on the efficiency of a user, and therefore, increases the overall cost of the process, it is desirable to provide indications of battery life and power consumption that are more accurate than those that currently exist.

Accordingly, there is a need, unmet by current communication systems and mobile devices, to address the issues noted above. There is particularly an unmet need in the area of increasing efficiency and accuracy in managing the power consumption of mobile devices.

SUMMARY OF THE INVENTION

A method and system for managing power usage of devices provides for selectively executing a program application on a plurality of battery powered devices. Battery usage data is generated in one or more of the devices during execution of the work application. The battery usage data includes the run-time of the battery for the program application being executed. The battery usage data can also include operating parameters for the battery, such as current, voltage and temperature parameters, for example. The battery usage data is aggregated and stored in memory for the plurality of devices. Using the data, an application specific battery profile is generated. The application specific battery profile is associated with the work application being run by the client devices. When a particular work application is then loaded onto a device, the battery profile associated with the work application is also loaded and is run to provide a more accurate indication of the remaining life of the battery for the device during a work shift or work application.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Embodiments of the invention are generally directed to a system and method for managing power usage of mobile devices using power sources, such as expendable or rechargeable batteries. For example, in work environments where workers or users wear mobile devices to receive instructions related to tasks to be performed by the worker, different work applications may be loaded onto the devices. The different work applications correspond to different task sets to be performed. Battery usage is monitored and data is collected based on the specific work applications. Application-specific battery or power consumption profiles are then created, and are used to more accurately predict battery life in a device, as it runs the work application associated with a particular battery profile.

Figure 1:
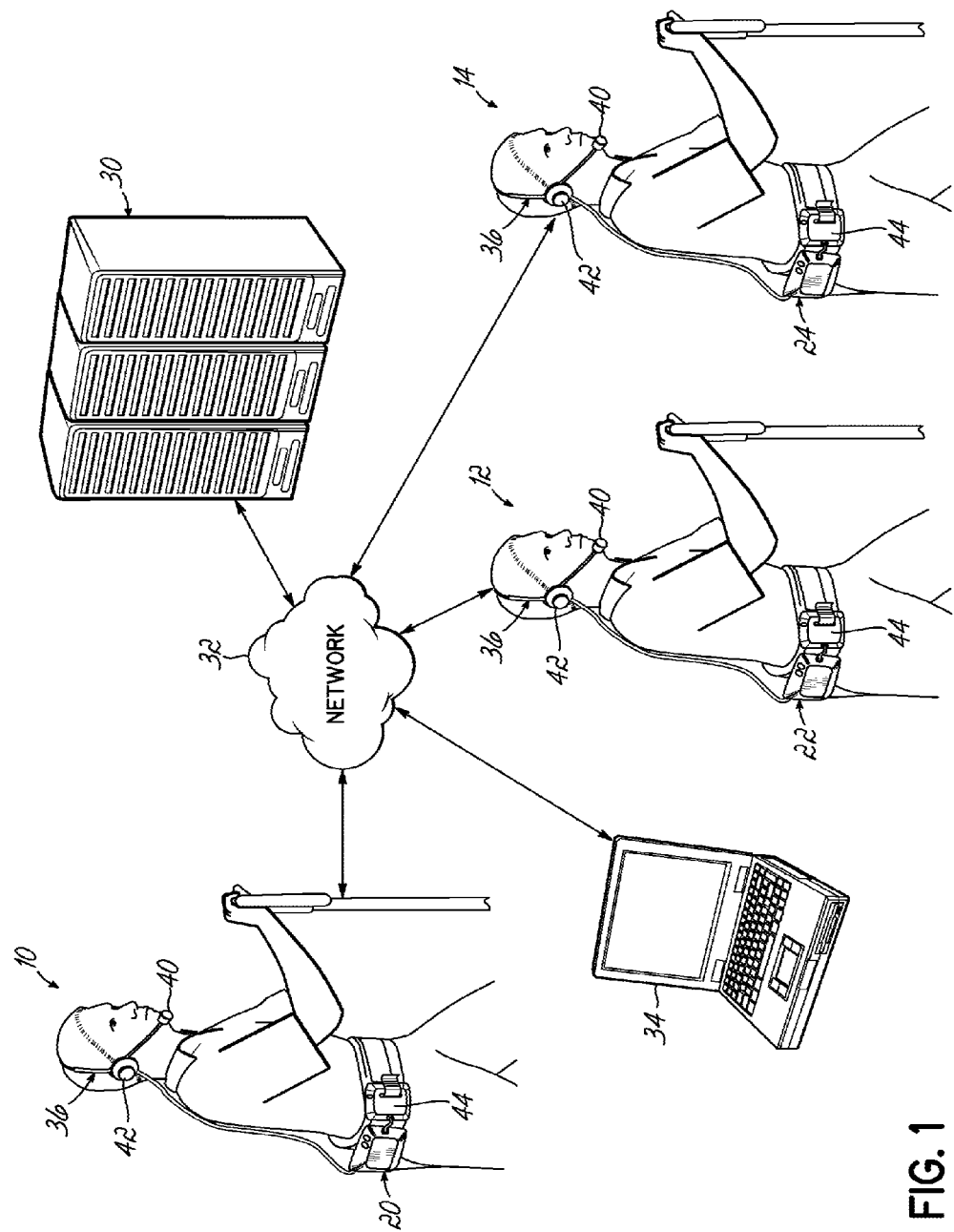
FIG. 1 is a diagrammatic illustration of a system including workers having mobile terminals and a management computer in communication with the mobile terminals consistent with embodiments of the invention.

Referring now to FIG. 1, which provides an exemplary mobile device workplace environment and includes a plurality of workers or users 10, 12, 14. As shown in FIG. 1, the users are equipped with portable or mobile devices 20, 22, 24 that are in communication with a WMS system computer or server 30 over communication network 32. Each device is also in communication with a management computer 34 that runs management software for managing the devices 20, 22, 24. Device profiles may be stored in the management computer 34, and may be transmitted over communication network 32 to be loaded onto one or more devices. The profiles may correspond to a set of work tasks to be performed, a specific worker's preference settings (e.g. speed of voice reproduction, language of voice reproduction, etc.), or other information associated with the work to be done by a user using the device. For the exemplary embodiments discussed herein, the mobile devices are mobile computer terminals that utilize speech functionality. However, the invention is not limited to such terminals, and will have applicability with other devices that implement specific applications using portable power sources, such as batteries.

Each of the mobile devices 20, 22, 24 are coupled with a suitable headset to be worn by a user for interfacing with the mobile devices using speech. The headsets 36 include one or more microphones 40, which capture user speech and one or more speakers 42, which play speech commands to a user, such as to direct the user through a plurality of tasks associated with a particular work application being run by the mobile device. The mobile devices 20, 22, 24 might also be coupled with one or more peripheral devices, such as scanners, readers, displays, printers, etc. FIG. 1 illustrates the devices 20, 22, 24 coupled with portable printers 44, for example.

Generally, the management computer 34 runs one or more software management tools that are used to provide device management, operator management, configuration management, and system diagnostics for the users and terminal devices, such as through a browser-based view. One particular management tool is the VoiceConsole® program available from Vocollect, Inc. of Pittsburgh, Pa. The management computer and the management software running thereon provide information regarding the users as well as the terminal devices. For example, it provides a view of the users that are currently using the devices, the various tasks and work applications that are running on each of the devices, and provides information about the users and the devices, as they move through the work applications on the devices. In accordance with one particular embodiment of the invention, the management computer 34 and the management applications thereon monitor parameters associated with the batteries that power each of the devices. More specifically, battery usage data is generated for a battery in one or more of the devices during execution of the work application. The battery usage data includes the run-time of the work application, which can be monitored by the device management application, and may also include one or more operating parameters of the battery and/or one or more environmental parameters associated with the device. For example, the current and the voltage provided by the battery might be monitored in relation to the run-time of the work application. Also, the temperature of a battery might be monitored as well. Also, environmental parameters of the device, such as the device ID, battery ID, and/or user ID, might be part of the battery usage data. Generally, such parameters are provided through the device to management computer 34. As discussed below the battery usage data for a plurality of devices may be stored and aggregated for the purposes of generating an application-specific battery profile that is associated with a particular work application that is being run by the devices. That application-specific battery profile can then be utilized to more accurately manage the power usage of the device, and provide feedback to a user with respect to that power usage and the remaining life or run-time for the battery when it is executing the associated work application.

Figure 2:
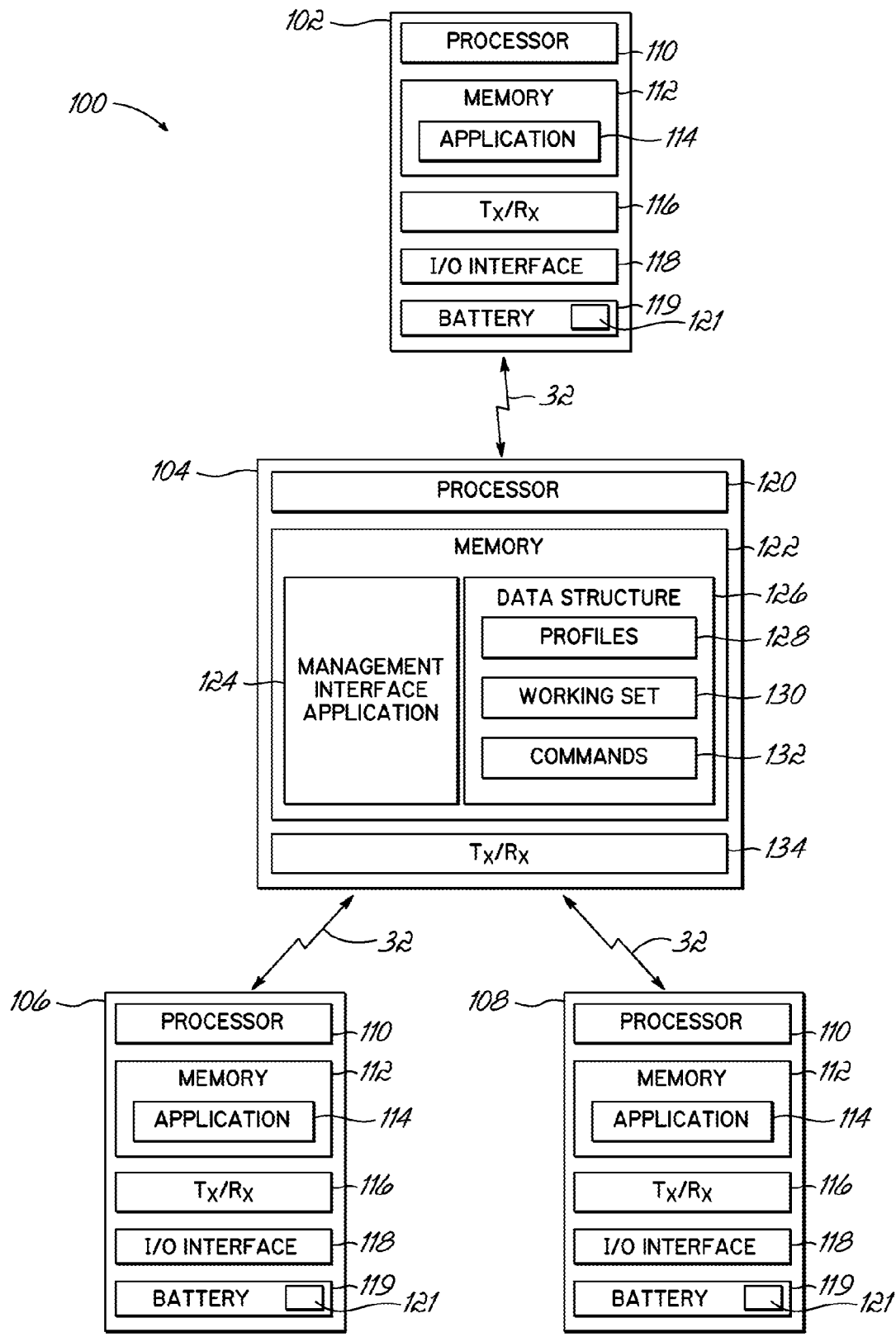
FIG. 2 is a diagrammatic illustration of a at least some components of the mobile terminals and management computer of FIG. 1.

Referring now to FIG. 2, which provides a mobile device system 100 consistent with some embodiments of the invention. System 100 includes management computer 104, mobile terminal devices 102, 106, 108. Similar to the system of FIG. 1, system 100 may be utilized to manage mobile devices 102, 106, and 108 through management computer 104. As shown in FIG. 2, the management computer 104, and mobile devices 102, 106, 108 may be in communication over the common communication network 32.

The mobile devices 102, 106, 108 each include a processor 110 and memory 112, where memory 112 includes one or more software applications 114 resident in memory 112. For example, such applications may comprise one or more applications configured to be executed by processor 110, such as the work applications that include a series of tasks to be performed by a user. The applications may also include the speech engine functionality run by the devices for monitoring a working speech dialog between a user and a device. In addition, the mobile devices include transceiving circuitry 116 to transmit and receive communications between management computer 104 and the mobile devices 102, 106, 108 over communication network 32. The mobile devices further include I/O interface 118, which is configured to receive input from a variety of sources including for example, speech input from a headset microphone or scanner/reader input from a barcode or RFID scanner/reader, and also to output data or communications, such as a text-to speech output to a headset speaker to be heard by a user. Suitable terminal devices for implementing the invention are the TALKMAN® devices also available from Vocollect, Inc. of Pittsburgh, Pa.

Each of the mobile devices 102, 106, 108 also include power sources, such as batteries 119 that provide power to the processor and other electronic circuitry of the devices for their operation. The batteries 119, in addition to having a suitable power source, such as one or more chemical cells, also include parameter circuitry 121, which provides information regarding the operating parameters of the battery. For example, the parameter circuitry might provide operating parameter data regarding the output voltage or voltage parameter of the battery, the output current or current parameter of the battery, and the internal temperature or temperature parameter of the battery. (Circuitry 121 might also provide environmental parameter data for the battery, such as the battery ID.) In the past, all that the mobile devices could do is monitor the output voltage of the battery or some other operational metric and assume a somewhat static graph or measurement, such as a voltage discharge curve, for the run-time of the battery. When the output voltage or other operational metric would reach a certain level, the mobile device might provide a warning that "30 minutes of run-time remain". If the output voltage level or other device/battery operational metric then decreased to a further, lower level for that metric or monitored parameter, the mobile device might shut down. However, because the run-time would be affected by the work application running on the mobile device, the communication network traffic handled within a particular run-time segment, and other factors, such as the efficiency of the user in the voice dialog, the estimation of remaining run-time based only upon the output voltage or some other device operational metric is inaccurate, as discussed above.

In accordance with the invention, a battery profile is developed, and is associated with a work application that is run on the device. The battery profile takes into account battery usage data that includes the run-time of work application being executed, as well as changes in operating parameters of the battery, during execution of the work application. The profile may also take into account environmental parameter data, such as the user ID, battery ID, and device ID. In that way, information about the battery usage and remaining run-time can be more accurately predicted for a specific work application, and use of a battery. Different variables and parameters are monitored in accordance with alternative embodiments of the invention to further increase the accuracy of the battery profile and indications of the remaining run-time for a device for more efficient and accurate power management. Furthermore, the profiles are updated as further information is gathered regarding the work applications and battery usage. The profile can then be loaded onto terminal devices that are loaded with a particular work application. In one embodiment, the battery profile can actually provide to a user the remaining run-time of the battery for that work application without requiring a constant measurement of battery operating parameters, such as voltage, current, and/or temperature. Once a battery profile is established and tied to a particular work application, it can be implemented and loaded onto a device each time that the device will be used for that particular work application.

Management computer 104 includes processor 120 and memory 122, where memory 122 may include a management interface application 124 resident thereon. The management interface application 124 comprises one or more operations configured to be executed by processor 120. Management application 124 includes a management interface configured to receive battery usage input data generated from the mobile devices. In addition, memory 122 may further include data structure 126. Data structure 126 may include stored terminal profiles 128, such as battery profiles generated by the invention, a working set data 130, including stored and aggregated battery usage data, and/or stored command functions 132. The stored command functions may be accessed by the management interface application 124 and executed by processor 120, such as to load devices with battery profiles. Management computer 104 may further comprise transceiving circuitry 134 that is connected to communication network 32 and configured to transmit and receive data to and from mobile devices 102, 106, 108.

Referring to FIG. 2, terminal applications 114 may be configured to include one or more work applications to be executed by a device, as well as device profiles. In accordance with one aspect of the invention, a device profile that is loaded on a mobile device may include a battery profile to allow the device to manage the battery or power usage and provide information to a user or to the management computer regarding the remaining run-time or battery life of the device batteries as a work application is executed.

In accordance with one feature of the invention, battery usage data for a battery in a client device is generated during execution of a work application. Specifically, the battery usage data includes the run-time of the battery for the work application being executed to determine the overall run-time for the battery associated with the work application. Herein, the term "work application" is used to broadly indicate particular tasks or workflows that are repeated by a device in a general sense. Such work applications are the basis for determining a particular run-time for accumulating data and generating an application-specific battery profile that is associated with the work application. Therefore, the term "work application" is not meant to be limiting, but rather is meant to designate a particular work unit that can be monitored and measured for the purposes of generating a battery profile in accordance with the invention.

To that end, each of the mobile devices 102, 106, 108 reports its run-time to the management computer 104, as it executes a work application. A particular battery will generally have a shutdown voltage, wherein it is desirable to shut down the device if the output voltage of the battery reaches a certain low level. For example, with a lithium ion battery that has a nominal 4.2 output voltage for operation, a selected shutdown voltage might be 3.35 volts, with the lithium ion battery essentially fully discharged at 2.5 volts. Accordingly, the management computer might measure the particular run-time that is achieved for the battery to reach the shutoff point, or some other arbitrary point that might be defined for indicating the end of the run-time for the battery. The battery usage data, such as run-time data, is sent from the battery and respective mobile devices to the management device, or overall management system, such as management computer 104 running the management applications. The battery usage data is stored and aggregated for a plurality of the mobile devices that are running specific work applications.

Preferably, the data for all mobile devices that are executing generally the same work application might be aggregated and/or averaged for indicating a particular average run-time for a fully-charged battery executing a particular work application. Using that data, an application-specific battery profile is generated, such as by the management computer 104. That profile would then indicate a battery profile linked to a specific work application. The battery profile may have an identifier assigned thereto that links it with a particular work application. That is, the application-specific battery profile and the identifier are associated with a work application that may be run by a mobile device. The battery profile might then be loaded onto any mobile device that is loaded with and will be executing that particular work application. Based upon that loaded battery profile, the user may then be notified of the remaining run-time or battery life for their device, as the work application is executed.

In one embodiment of the invention, the run-time data regarding the use of the battery is linked to the battery profile, and the management computer only utilizes run-time as the particular battery usage data to generate the battery profile. In such an embodiment of the invention, no specific measurement of operational parameters regarding the battery are necessary. The battery profile is based on a significant number of uses and executions of the particular work application that is associated with the battery profile.

In other embodiments of the invention, other parameters might be implemented and measured, and also included as part of the battery profile data in order to develop the profile. To that end, as run-time data is accumulated, operating parameter measurements, and changes in those operating parameters, might also be accumulated, and then stored and aggregated for the purposes of generating an application-specific battery profile. For example, the output voltage and the change in output voltage might be measured as an operating parameter over the run-time of the work application. The voltage parameter data might be implemented in the development of the battery profile. Similarly, the output current or a current parameter provided by the battery might also be measured and monitored, with the data regarding that current operating parameter also stored and aggregated for the purposes of generating an application-specific battery profile. Temperature is another operating parameter that may be part of the battery usage data that is stored and aggregated for a plurality of devices. Further embodiments of the invention might also monitor parameters such as accumulated current and cell impedance for a battery device. When an application-specific battery profile is generated in accordance with the principles of the invention, such operating parameters, in addition to run-time, may provide additional accuracy to the profile for determining the remaining run-time left in the battery for a particular work application, and also for the purposes of alerting the user regarding the remaining run-time.

In accordance with another aspect of the invention, the battery profile might be generated based on other battery usage data that goes beyond the specific battery operating parameters, such as voltage, current, and temperature. For example, the application-specific battery profile might use battery usage data that takes into account other environmental parameters, such as the specific user of the battery, the particular terminal device in which the battery is used, as well as the specific battery used. For example, particular users may be more or less efficient in progressing through a work application and a speech dialog associated with a work application than other users. To that end, the efficiency of a user may affect the run-time of a battery, and thus, may affect the application-specific battery profile. Accordingly, the environmental parameter data associated with a specific user or user ID might be gathered with other battery usage data and incorporated into the battery profile. If the battery profile is loaded onto a terminal device where a particular user is logged in, the battery profile may be adjusted to be more specifically-tailored for that user. Or, the battery profile may actually be user-specific. For example, if the user is particularly efficient, the battery profile might indicate a longer run-time for a particular work application than would be indicated for a less efficient worker. Efficiency may be based upon user familiarity with the work application, or the facility, or other factors, and therefore, such environmental features associated with the user of the battery may be taken into account in the gathering of data and the generation of a battery profile.

Similarly, a particular terminal device, based upon its electronic components, may be more or less power efficient than other terminal devices in the power consumption of the battery. As such, the battery usage data may be stored and aggregated with respect to a particular terminal device ID. In that way, the battery profile might be generated to take into account a particular terminal ID. Therefore, if a battery profile is loaded onto a terminal device having a particular battery ID, the battery profile might be adjusted accordingly. Alternatively, the profile generated might be device ID-specific initially.

A particular battery may also be more efficient or less efficient in storing a charge. Therefore, an environmental parameter, such as battery ID, may be part of the battery usage data used to generate a profile. For example, the age of the battery, the number of usage cycles that the battery has seen, as well as other operational features of the battery may affect its stored charge and its run-time with a particular work application. Therefore, even though a general battery profile developed for a large number of such batteries might be loaded, the specific battery profile loaded for a device may take into account the battery ID of the battery in the device, and thus, adjust the battery profile accordingly. Alternatively, the profile generated might be battery ID-specific initially.

Figure 3:
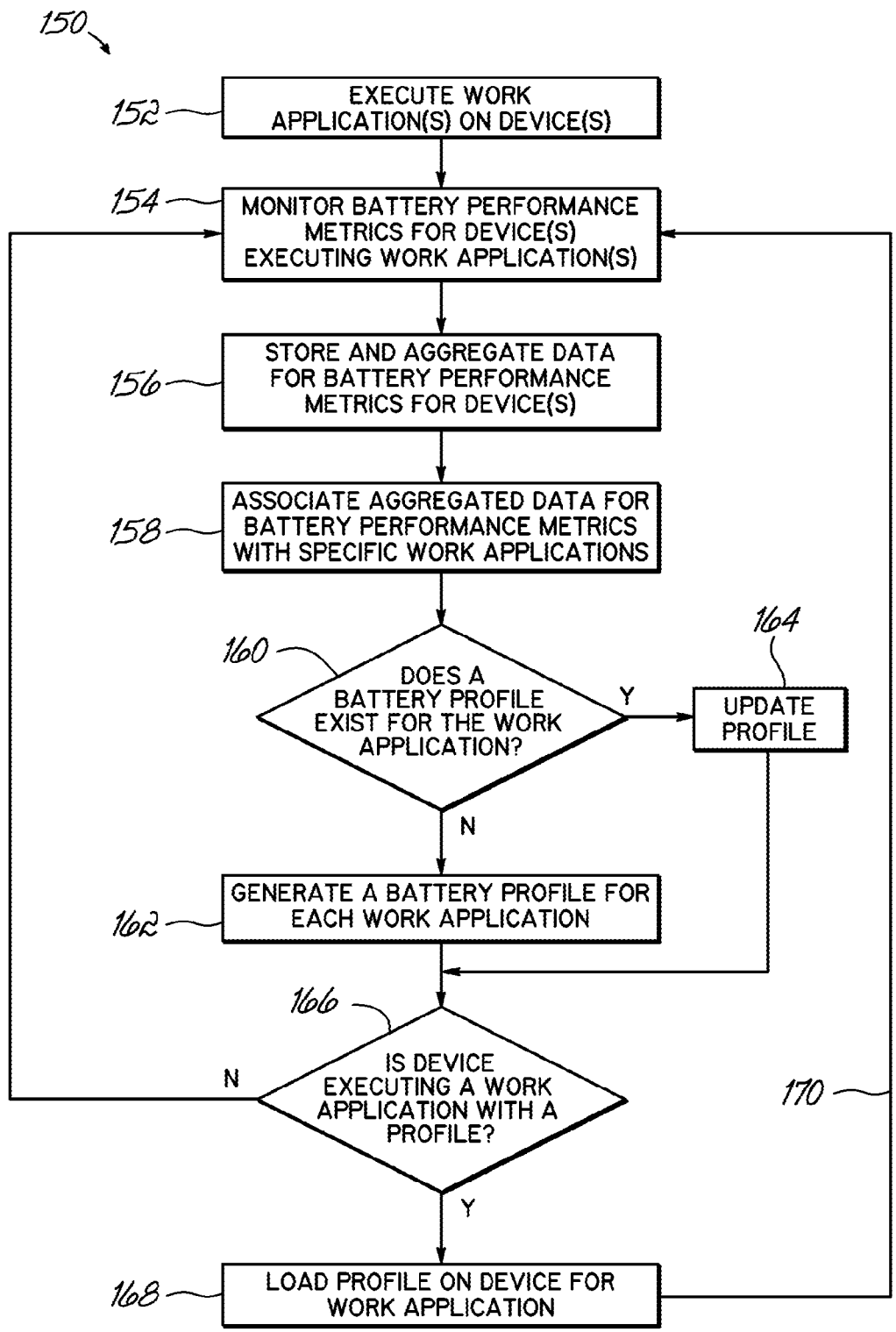
FIG. 3 is a flowchart illustration of one embodiment of the invention.

FIG. 3 illustrates one embodiment of the invention involving use of an application-specific battery profile for a facility handling a number of different work applications, such as a warehouse facility. Application-specific battery profiles may be developed for each of the defined work applications handled at a facility for more accurately providing the user with information regarding the remaining run-time for the terminal device, and particularly the remaining life for the power source, such as a battery, used in the terminal device. Referring to FIG. 3, the process 150 begins generally with the execution of a work application, or a plurality of work applications by a plurality of devices. Generally, the battery profile is best developed from a large number of uses, and thus, a plurality of different work application executions may be monitored, such as by the management computer 104. The work applications are executed on a plurality of battery-powered devices by users doing work. Battery performance metrics are monitored for the various devices executing the work application to generate battery usage data. As noted above, in one embodiment, the battery performance metric that is monitored includes the run-time of the battery for a particular work application. By monitoring such battery performance metrics, the battery usage data for a battery is generated during the execution of the work applications. Other battery performance metrics might also be monitored, including temperature, current, and voltage parameters for the purposes of generating battery usage data that includes changes in one or more operating parameters of the battery. The battery usage data generated might also take into account environmental factors, such as the particular user and user ID, the ID of the terminal device, and the ID of the battery. Therefore, various different battery performance metrics are monitored according to step 154 to generate the battery usage data.

The data is then stored and aggregated for the various monitored devices (step 156). For example, the battery usage data associated with a battery-powered device might be transceived with the management system, such as management computer 104, over a suitable communication network. Battery usage data for a plurality of different devices that are executing a plurality of different work applications are stored and aggregated. The aggregated battery usage data for the various monitored battery performance metrics are stored and associated with a specific work application. For example, the run-time of a particular work application may be aggregated over a plurality of devices so that an average run-time for the devices executing the particular work application may be determined. The data may be accumulated and stored in memory (step 156) and associated with the specific work application (step 158). The data may be continuously updated, as more work applications are executed and more data is aggregated for the particular work application.

When a sufficient amount of data has been accumulated, a battery profile is generated. The battery profile is application-specific with respect to a monitored work application. The battery profile is generated using the aggregated and stored battery usage data, and the data may be associated with any of the monitored battery performance metrics, including the battery run-time for the work application, battery operating parameters for the work application, or battery environmental parameters associated with running the work application. According to step 160, after data has been aggregated, a determination might be made regarding whether a battery profile exists for the particular work application associated with the data. If not, a battery profile might be generated for the particular work application according to step 162. If a battery profile already exists, any newly-aggregated data might be used to update that profile according to step 164 in FIG. 3.

Once a battery profile exists, each time that a device would be loaded with a particular work application for the purposes of executing that work application, then the battery profile associated with that work application might also be loaded onto the device. To that end, a test might be made according to block 166 in FIG. 3, whenever a work application is loaded onto a device. If no profile exists for the particular work application, program flow might trigger the invention to monitor the battery performance metrics for the device executing the work application that it is running so that a battery profile might be generated. However, as noted in the program flow of block 166, if a profile does exist, that profile might then be loaded according to block 168. Monitoring of battery performance may then continue as illustrated by path 170 in FIG. 3, so that profiles may be updated and/or loaded as desired based on the application and use of the device.

Once a battery profile is loaded onto a device, the device will operate utilizing that profile, and provide suitable indications to the user of the device with respect to the remaining run-time of the device for the particular work application being executed. The indication might be provided through the speech dialog in a speech-based device of system. Alternatively, other indication methods might be utilized, such as through a graphic display, or through indicator lights or some other appropriate manner of providing a perceptible indication to a user of a device.

Those skilled in the art will recognize that the exemplary environment illustrated in FIGS. 1 and 2 are not intended to limit the invention. Indeed, those skilled in the art will recognize that other alternative hardware and/or software environments, and incorporating different numbers and configurations of hardware resources, may be used without departing from the scope of the invention. Those skilled in the art will also recognize that the invention contemplates all types of computing systems, including computing systems and other programmable electronic devices configured with processors, memory and/or storage devices, including, for example, client computers, server computers, portable computers, handheld computers, embedded controllers, etc.

The routines executed to implement the embodiments of the invention, including the execution of routines associated with a battery profile loaded on a device or associated with the aggregation of battery usage data or the generation of a profile, whether implemented as part of an operating system or a specific application, component, program, object, module or sequence of instructions executed by one or more computing systems is referred to herein as a "sequence of operations," a "program product," or, more simply, "program". The program typically comprises one or more instructions that are resident at various times in various memory and storage devices in a computing system or device (e.g., the mobile terminal device, the management computer, etc.), and that, when read and executed by one or more processors of the system, cause the system to perform the steps necessary to execute steps, elements, and/or blocks embodying the various aspects of the invention. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

In addition, one or more processors of the computing system may execute computer program code in one or more memory and/or storage devices of the computing system, and that memory may represent the random access memory (RAM) devices comprising the main storage of a computer, as well as any supplemental levels of memory, e.g., cache memories, non-volatile or backup memories (e.g., programmable or flash memories), read-only memories, etc. In addition, a memory may be considered to include memory storage physically located elsewhere in a computer, e.g., any cache memory in a processor, as well as any storage capacity used as a virtual memory, e.g., as stored on a mass storage device or on another interconnected computer.

While embodiments of the invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, embodiments of the invention in broader aspects are therefore not limited to the specific details, representative apparatus and method. Additionally, any of the blocks of the above flowcharts may be deleted, augmented, made to be simultaneous with another, combined, or be otherwise altered in accordance with the principles of the embodiments of the invention. Accordingly, departures may be made from such details without departing from the scope of applicant's general inventive concept.

The invention claimed is:

1. A method of managing power usage of a device, comprising:
    selectively executing a work application on a plurality of the devices having rechargeable batteries, the work application corresponding to a set of tasks to be performed in a work environment by a user of the device;
    generating battery usage data for a rechargeable battery in one or more of the plurality of the devices during execution of the work application, the battery usage data including battery ID information for a specific rechargeable battery in the device of the plurality of the devices and the run-time of the specific rechargeable battery for the work application being executed by the device;
    storing in non-transitory memory the battery usage data for a plurality of specific battery IDs and for the plurality of the devices; and
    generating an application specific battery profile associated with a specific battery ID of the plurality of specific battery IDs using the stored battery usage data, the application specific battery profile being associated with the work application being run by the device;
    adjusting the application specific battery profile associated with the specific battery ID to account for the unique characteristics of the specific rechargeable battery associated with the specific battery ID, wherein the unique characteristics are determined at least in part by the age and number of usage cycles associated with the specific rechargeable battery associated with the specific battery ID;
    in response to loading of the work application on the device, determining the battery ID of a replacement battery in the device and transmitting data from the application specific battery profile for that battery ID to the device.

2. The method of claim 1, wherein the battery usage data includes changes in an operating parameter of the battery during execution of the work application, the operating parameter data being used in generating the application specific battery profile.

3. The method of claim 2, wherein operating parameters of the battery comprise a current parameter, a voltage parameter, a temperature parameter, an accumulated current parameter, and/or a cell impedance parameter.

4. The method of claim 1, wherein the battery usage data includes environmental parameters associated with the device.

5. The method of claim 4, wherein the environmental parameters associated with the device include a device ID and/or a user ID.

6. The method of claim 1, comprising transceiving the battery usage data from the device to a management system for aggregating and storing the battery usage data.

7. The method of claim 1, comprising using the data from the application specific battery profile on the device when the work application is executed by the device.

8. The method of claim 7, comprising generating additional battery usage data for the device when the work application is executed, and updating the application specific battery profile using the additional battery usage data.

9. A system, comprising:
    a device comprising a rechargeable battery and processing circuitry configured to:
        selectively execute a work application, the work application corresponding to a set of tasks to be performed in a work environment by a user of the device;
        generate battery usage data for the rechargeable battery during execution of the work application, the battery usage data including battery ID information for the specific rechargeable battery in the device and the run-time of the rechargeable battery for the work application being executed by the device; and
        transmit the battery usage data; and
    a management computer comprising a non-transitory memory and processing circuitry configured to:
        receive battery usage data from a plurality of the devices;
        store the received battery usage data in memory for a plurality of the rechargeable batteries with specific battery IDs;
        generate an application specific battery profile associated with a specific battery ID using the stored battery usage data, the application specific battery profile being associated with the work application being run by the device;
        adjust the application specific battery profile associated with the specific battery ID to account for the unique characteristics of the rechargeable battery associated with the specific battery ID, wherein the unique characteristics are determined at least in part by the age and number of usage cycles associated with the rechargeable battery associated with the specific battery ID; and
        load a work application on the device to determine the specific battery ID of the rechargeable battery in the device and to transmit data from the application specific battery profile associated with that specific battery ID to the device.

10. The system of claim 9, wherein:
the processing circuitry of the device is configured to generate battery usage data comprising changes in at least one of the operating parameters of the rechargeable battery during execution of the work application; and
the processing circuitry of the management computer is configured to use the operating parameter data to generate the application specific battery profile.

11. The system of claim 10, wherein the operating parameters of the rechargeable battery comprise a current parameter, a voltage parameter, a temperature parameter, an accumulated current parameter, and/or a cell impedance parameter.

12. The system of claim 9, wherein:
the processing circuitry of the device is configured to generate battery usage data that includes environmental parameters associated with the device; and
the processing circuitry of the management computer is configured to use the environmental parameter data to generate the application specific battery profile.

13. The system of claim 12, wherein the environmental parameters associated with the device comprise a device ID and/or a user ID.

14. The system of claim 9, wherein the device processing circuitry is configured to use the data from the application specific battery profile when the work application is executed by the device.

15. The system of claim 14, wherein the device processing circuitry is configured for:
generating additional battery usage data for the device when the work application is executed; and
transmitting the additional data to the management computer.

16. The system of claim 15, wherein the management computer processing circuitry is configured for updating the application specific battery profile using the additional battery usage data.

17. A method of creating a battery profile, by a management computer comprising a non-transitory memory and processing circuitry for:
generating an application specific battery profile associated with (i) a specific battery ID and (ii) a work application being run by a device using battery usage data generated by the device during execution of the work application; and
adjusting the application specific battery profile associated with the specific battery ID to account for the unique characteristics of a battery associated with the specific battery ID, wherein the unique characteristics are determined at least in part by the age and number of usage cycles associated with the battery associated with the specific battery ID.

18. The method claim 17, wherein the battery usage data comprises data generated by a plurality of the devices for a plurality of the specific battery IDs.

19. The method of claim 17, comprising transmitting data from the application specific battery profile for the specific battery ID to the device in response to loading of the work application on the device.

20. The method of claim 17, wherein the battery usage data includes changes in an operating parameter of the battery during execution of the work application, the operating parameter data being used in generating the application specific battery profile.

* * * * *